(12) United States Patent
Ichikawa

(10) Patent No.: US 7,033,547 B1
(45) Date of Patent: Apr. 25, 2006

(54) EXHAUST GAS TREATING APPARATUS AND VEHICLE EQUIPPED WITH THE APPARATUS

(76) Inventor: Yataro Ichikawa, 11-7, Kotesashicho 2-chome, Tokorozawa-shi, Saitama 359-1141 (JP)

( * ) Notice: Subject to any disclaimer, the term of this patent is extended or adjusted under 35 U.S.C. 154(b) by 0 days.

(21) Appl. No.: 09/869,904

(22) PCT Filed: Jan. 18, 2000

(86) PCT No.: PCT/JP00/00194

§ 371 (c)(1),
(2), (4) Date: Jul. 9, 2001

(87) PCT Pub. No.: WO00/43109

PCT Pub. Date: Jul. 27, 2000

(30) Foreign Application Priority Data

Jan. 19, 1999 (JP) ................... 11-46896

(51) Int. Cl.
*B01D 50/00* (2006.01)
*B01D 47/00* (2006.01)
*C01B 21/00* (2006.01)
*B01J 8/00* (2006.01)

(52) U.S. Cl. ................. 422/168; 423/210.5; 423/212; 423/235; 423/239.1

(58) Field of Classification Search ............ 423/210.5, 423/212, 235, 239.1; 422/168
See application file for complete search history.

(56) References Cited

U.S. PATENT DOCUMENTS

| | | | | |
|---|---|---|---|---|
| 5,451,558 A | * | 9/1995 | Campbell et al. | 502/325 |
| 5,599,758 A | * | 2/1997 | Guth et al. | 502/34 |
| 5,874,057 A | * | 2/1999 | Deeba et al. | 423/239.1 |
| 5,939,354 A | * | 8/1999 | Golden | 502/302 |
| 5,965,481 A | * | 10/1999 | Durand et al. | 502/304 |
| 6,387,138 B1 | * | 5/2002 | Murayama et al. | 44/387 |
| 6,420,306 B1 | * | 7/2002 | Kurokawa et al. | 502/261 |
| 6,548,446 B1 | * | 4/2003 | Koermer et al. | 502/249 |

FOREIGN PATENT DOCUMENTS

| | | |
|---|---|---|
| JP | 51-18270 A | 2/1976 |
| JP | 58-58130 A | 4/1983 |
| JP | 3-21320 A | 1/1991 |
| JP | 5-90132 U | 12/1993 |
| JP | 6-25509 U | 4/1994 |
| JP | 8-42330 A | 2/1996 |

\* cited by examiner

*Primary Examiner*—Stanley S. Silverman
*Assistant Examiner*—Jonas N. Strickland

(57) ABSTRACT

An exhaust gas treating an apparatus and a vehicle vehicles equipped with the apparatus, wherein a liquid-including substance having salt including oxygen acid radical of nitrogen is installed in an exhaust gas passage to treat exhaust gas having carbon-containing particles and nitrogen oxides for removal of these harmful components.

20 Claims, 5 Drawing Sheets

EXHAUST GAS TREATING APPARATUS AND VEHICLE EQUIPPED WITH THE APPARATUS

FIELD OF THE INVENTION

This invention relates to an apparatus for treating exhaust gas and a vehicle equipped with the apparatus.

BACKGROUND OF THE INVENTION

Many methods have been practically applied and proprosed for reducing the pollutants in the exhaust gas. In these methods, the exhaust gas treatment have been improved in the equipment or its operation of the exhaust gas sources and treatment of the exhaust gas. Thus, the emission of pollutants in the exhaust gas have been considerably suppressed, but it is still unsatisfactory and the new excellent techniques have been requested for further reducing the pollutants in the exhaust gas.

The substances occuring in the combustion of fuels, for example, nitrogen oxides, carbon-containing particles, carbon monoxide, hydrocarbons are regarded as pollutants in the exhaust gas. Nitrogen oxides and carbon-containing particles are cited as particularly troublesome substance in the exhaust gas from the internal combustion engine.

The method for removing the nitrogen oxides from the exhaust gas with a supported solid catalyst, so called "three way catalyst" has been practically applied, and can be applied only to very narrow range of air-fuel ratio, so called "window", but cannot be applied to the exhaust gas from Diesel engine or lean-burn gasoline engine in an excessive oxygen atmosphere, as the theoretical air-fuel ratio is required to be precisely controlled.

Recently, a NO x storage-reduction three way catalyst system to be applied to the lean burn gasoline engine has been practically applied (WO 93/07363, S.A.E. paper 950809, Catalysis Today 27 (1996) 63). But this system has a problem on the performance deterioration caused by the sulfur in the fuel.

An method to use molten salts for treating an exhaust gas including nitrogen oxides has been disclosed. (J.P. publication No 34564/1970. J.P. publication No 5633/1976. U.S. Pat. No. 3,671,185, U.S. Pat. No. 3,718,733, U.S. Pat. No. 3,754,074, U.S. Pat. No. 3,817,715). It relates to the absorption and removal of nitrogen oxides with a molten alkali carbonate at an elevated temperature higher than 350° C. Consequently, it may be difficult to secure a constant performance in the treatment of the exhaust gas from such a vehicle engine of which the operation conditions are drastically fluctuated. Further, the removal of the nitrogen oxides by absorption is poor in the presence of carbon dioxide. Further more, in particular, a problem remains in the initial cleaning of the exhaust gas from the start of the operation until the temperature of the exhaust gas treatment apparatus reaches the high actuation level.

The carbon-containing particles in the exhaust gas can be effectively removed by capturing them with a filter which is often blocked with the carbon-containing particles and required to be frequently exchanged with a fresh one. The oxidative removal of the carbon-containing particles accmulated on the filter has been tried in the presence of a catalyst supported on the filter, the filter is often damaged by the steep temperature rise.

In a proposal, the carbon-containing particles in the exhaust gas are used to remove the nitrogen oxides and both of them are expected to remove simultaneously. But, a solid catalyst is used in the process and the solid carbon-containing particles can not be satisfactory captured and reacted.

DISCLOSURE OF THE INVENTION

An object of the invention is to provide an apparatus treating an exhaust gas by removing at least one of polutants of carbon-containing particles and nitrogen oxides in the exhaust gas without consumption of materials which have economical or enviromental problems, in no need of any complicated controlling mechanism and at a relatively low temperature. Further, another object of the invention is to provide a vehicle equipped with the apparatus.

In the invention, the carbon-containing particle means generally particulate, smoke(SM), soot, carbon, particle, etc. Its component comprises solid carbon, unburned fuel, lubricating oil, sulfates combined water and the like.

Nitrogen oxides comprise mainly nitrogen monoxide NO and nitrogen dioxide $NO_2$ and may include small amounts of $N_2O$ and $N_2O_3$ in the exhaust gas.

The conventionally proposed methods for simultaneously removing nitrogen oxides and carbon-containing particles by reducing the nitrogen oxides with the carbon-containing particles are not always effective, because the exhaust gas caming from the turbo-charger of diesel engine has a low temperature, for example lower than 300° C., thus the reaction of the carbon-containing particles with the nitrogen oxides can not sufficiently proceed in the exhaust gas having a lower oxygen concentration than in the atmospheric air by the one time passing and short time contact over the solid catalyst.

In this invention, at least one reaction zone containing a liquid-including substance that is reactive with the carbon-containing particles in the exhaust gas is installed in the exhaust gas passage line starting from the exhaust gas emission source to capture the carbon-containing particles by the liquid-including substance and allowed to react with the salts including oxygen acid radical of nitrogen to form the reaction products with the carbon-cotaining particles, for exhample, the salts including carbonic acid radical. Thus said liquid-including substance having the salts including carbonic acid radical absorbs and reacts with the nitrogen oxides in the exhaust gas to produce the salts including oxygen acid radicals of nitrogen and recover its ability to react with the carbon-containing particles, resulting in both decrease of the nitrogen oxides and the carbon-containing particles.

In this invention, a reaction zone is a comprehensive representation of a reaction area and does not specify the shape of it.

Any exhaust gas, which include nitrogen oxides and reductant like carbon-containing particles, carbon monoxide, hydrocarbons, etc, and further may include oxygen and water vapor, can be treated regardless of the sources in the invention The method may be favorably applied to the exhaust gas of internal combustion engine, in particular, of diesel engine.

DESCRIPTION OF A PREFERRED EMBODIMENT

Figure 1:
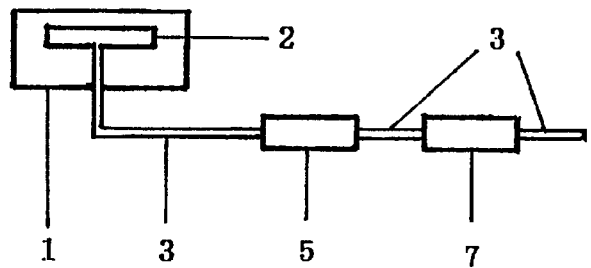
FIG. 1 is a block schematic diagram of an apparatus for embodying the invention.

The liquid-including substance in the invention has at least partially liquid surface and can adhere to capture carbon-containing particles in the conditions of the invention. The substance includes liquid or a mixture comprising liquid and solid. The solid may be in any shape, for example, lump, particle or powder, but particle or powder is preferable. The mixture of liquid and solid may be fluid as in a suspension or not, but preferably has fluidity. Any proportion of solid to liquid in the mixture may be allowed as long as the mixture is adhesive. The content of the solid in the suspension is generally lower than 50 vol %, usually lower than 40 vol %, but it depends on the size and the shape of the solid particles.

The active component included in the liquid-including substance, which reacts with the carbon included in the carbon-containing particles to be converted to $CO_2$ and/or the salts including carbonic acid radicals, comprises salt including oxygen acid radicals of nitrogen. The oxygen acid radical of nitrogen comprises generally nitrite radical $NO_2$ and/or nitrate radical $NO_3$ preferably nitrate radical. The salt including oxygen acid radicals of nitrogen is also produced by reaction of nitrogen oxides with the salt Includin carbonic acid radical under the operation condition of the system, if necessary, in the presence of free oxygen in the exhaust gas. The substance has at least one of nitrite radical and nitrate radical, and may include other anion radical harmless to the process in the invention, for example, basic salts having hydroxy radical, polynuclear salts having oxo bridges and salts having less the carbonate radical than the oxygen acid radical of nitrogen and the like. Similarly, the salt including carbonic acid radical also have the carbonate radical $CO_3$ and may contain other anions harmless to the process in the invention, for example, basic salts having hydroxy radical, polynuclear salts having oxo bridges and salts having less oxygen acid of nitrogen than the carbonate radical and the like.

The salt including carbonic acid radical has generally a higher melting point and a lower solubility than the salt including oxygen acid radical of nitrogen, and consequently, the content of the salt including carbonic acid radical dissolved in the liquid under the operation condition does not exceed the content of the salts including oxygen acid radical of nitrogen in the liquid. The content of the salt including carbonic acid radical may be allowed to be substancially zero in the invention. For example, the solubility of sodium carbonate is 0.001 mol % in the eutectic mixture of lithium nitrate and potassium nitrate at a temperature of 160° C. Thus, the salt including carbonic acid radical acts as a solid-liquid mixture, when the content exceeds the solubility to form solid particles. When the liquid-including substance contains the solid in this invention, the content of the salt including oxygen acid radical of nitrogen in the solid is very low. The salt including oxygen acid radical of nitrogen, water and other liquid media forms chiefly a liquid phase, and the salts including carbonate radical, oxides, hardly soluble hydroxide and other hardly soluble compounds like salts having radicals of phosphate, borate, sulfate, sulfite, bisulfate etc. remains in the solid phase, if they are contained in the mixture.

The salts including oxygen acid radical of nitrogen reactive with the substance containing solids, for example, carbon containing particles effectively catch and react with the solid particles in a liquid state, while the solids for example, the salt including carbonic acid radical reactive with the gas phase substances as nitrogen oxides or their solution dissolved in the liquid, can attain the object to absorbing and reacting with the target reactants at a relatively low temperature even in the solid state.

If the wanted state occurs under the operation condition in the invention, any initial stock may be employed in the reaction zone. Thus, at least one of the salt including oxygen acid radical of nitrogen may be added from the start of the operation, or at least one of the substance convertible to the salt via reaction with nitrogen oxides, if necesary, may be also added togather with oxygen, and further their mixture also may be used as the stocks.

As the substance convertible to the salt including oxygen acid radical of nitrogen, oxides, hydroxides or the salt having weaker acid radical than nitric acid like carbonic acid, bicarbonic acid, organic carboxylic acids, phosphoric acid, boric acid, silicic acid, alumnic acid etc. are cited, but is not limited to them.

Any cation which can form the salt including oxygen acid radical of nitrogen may be used, if the cation is able to form the salt including oxygen acid radical of nitrogen by reaction with nitrogen oxides in the exhaust gas, if necesary, togather with oxygen under the operational conditions.

The cations that can form the salt including oxygen acid radical of nitrogen has generally basic character and the index of basidity of an ion is expressed a square root of the ionic potential of cation which is less than 2.2. (G. H. Cartledge J. Am. Chem. Soc. Vol 50 2855~2872(1928)). For example, these cations are ions of group 1, for example, Li, Na, K, Rb, Cs, group 2, for example, Mg, Ca, Sr, Ba, Zn and group 3 for example, Al, Sc, Y, and rare earth metals, for example, La, Pr, Ce, Nd, Sm and so on, in the periodic table. In these, generally, the group 1 and the group 2 are used, and Na, K, Mg and Ca are preferable, further more Mg and Ca are most preferable to be used. These may be used singly, in a mixture with more than one, in the form of a double salt or coordination compounds.

The liquid according to the invention is used in a molten state or in a solution state, and the molten state is preferable, because it is possible to form a highly concentrated liquid under the operational conditions in the invention.

Many salts including oxygen acid radical of nitrogen are known to form eutectic mixtures at a relatively low temperature.

Water effectively forms a liquid phase, and the salts having hydrated water as the water of crystallization, in particular, the hydrated salts including oxygen acid radical of nitrogen or carbonic acid radical are preferable, because the hydrated salt having the water of crystallization have much lower melting points than those of their anhydrous salt. For example, the melting point of anhydrous calcium nitrate is 561° C., while calcium nitrate tetrahydrate melts at 42.7° C. Magnesium nitrate hexahydrate melts at a temperature of 90° C. These substances melt to form a liquid state and keep the state at a temperature higher than 100° C.

When a composition forming the liquid-including substance soluble or dispersible in water, is installed in the reaction zone, at least a part of the water is distilled off after starting of the operation and the reaction zone is kept in the equilibrium of water content. In the rest of the operation, the reaction zone can keep its fluidity by absorbing the atmospheric moisture or, if necessary, by adding water out of the reaction zone, at a temperature lower than 100° C. In addition, the presence of water is also effective for increasing safety of the reaction zone.

Any amount of water may be used, if the object of the invention can be achieved in the presence of water in the reaction zone, but the amount of water is varied depending on the composition and the temperature of the reaction zone. The content of water in the liquid of the liquid-including substance may be generally more than 1%, preferably more than 5%, though no upper limit particularly, and generally lower than 50%, preferably lower than 30% by weight. For example, the saturated solution of magnesium nitrate have about 14% water by weight at a temperature of 200° C.

Some liquid substances harmless to the operation under the conditions in this invention may be used as a solvent medium, for example, oxygen acids of phosphorus or its salts, salts of bisulfuric acid and salts of pyrosulfuric acid and so on. For specific examples, orthophosphoric acid, metaphosphoric acid, polyphosphoric acid, potassium dihydrogen orthophosphate($KH_2PO_4$), sodium bisulfate and potassium bisulfate etc. can be cited. Any amount of these solvents may be used, if the objects of the invention can be achieved.

Any concentration of the salt including oxygen acid radical of nitrogen in the total salts may be allowed in the liquid, if the objects of the invention are achieved, but it is generally more than 5%, preferably more than 20%, especially more than 50% by on a weight basis.

Catalysts are effective for operating the reation zone smoothly in the invention, and metals with variable valences or noble metals and their compounds are used as the catalyst. Elementary metals, their compounds and mixtures of copper, vanadium, cobalt, nickel, molybdenum, cerium, silver, iron, manganese, lead and so on, and platinum noble metals group, such as platinum, palladium, rhodium, ruthenium, and iridium can be cited. These catalysts may be dissolved or dispersed in suspension in the liquid or carried on solid carriers and wetted with said liquid-including substance.

Further, the packings in the capturing zone of the reaction zone device may be constituted from these catalytic substance itself or the catalytic substance may be carried on the packings. When the catalyst is used in the form of solution, dispersion or suspension, the amount of the catalyst is not particularly limited, but in general, it is 0.001120 wt %, preferably 0.1~10 wt % based on the liquid-containing substance.

Any amount of the liquid-containing substance in the reaction zone may be used, if the object of the invention can be achieved, but it varies depending on the desired levels of the removing rate of the pollutants and the desired duaration time while the exhaust gas can be treated. In the case of an internal combustion engine, the amount is generally more than 0.1 liter, preferably more than 0.2 liter, and there is no upper limit, but it is generally less than 20 liter preferably less than 10 liter per 1 liter of a exhaust capacity in an internal combustion engine.

Any operating temperature in the reation zone may be allowed, if the object of the invention can be achieved. But the temperature is generally higher than 100° C., preferably higher than 150° C. At the upper limit of the operating temperature, nitrogen oxides can be at least partialy absorbed and causes substantially no liberation of nitrogen oxides by the decomposition of the salts including oxygen acid of nitrogen. But the operating temperature varies according to the components of the liquid-containing substances. Generally the temperature is lower than 400° C., preferably lower than 350° C., especially lower than 300° C.

Nitrogen oxides can be absorbed by the component which can absorb and react with the nitrogen oxides in the invention even at a temperature lower than 100° C. But the decrease of the carbon-containing particles by the reaction of the carbon-containing particles and the salt including oxygen acid radical of nitrogen, for example, formed from the absorption is insufficient at temperature lower than 100° C. Thus a temperature higher than 100° C. is favorable for the effective both decrease of the nitrogen oxides and the carbon-containing particles by changing to nitrogen $N_2$ and carbon dioxide $CO_2$.

The temperature of the reaction zone depends on the location of the reaction zone as well as the temperature and the amount of the exhaust gas inflow. Thus, if necessary, some known heating or cooling means may be applied to the reaction zone for reaching the desired temperature, for example, heating may be carried out with electric heater or hot fluid media, for example, hot air by combustion, ordinary or super heated steam via outer wall or direct injection of the media into the zone, and cooling may be carried out with known cooling media cooled by the refrigerator, water or atmospheric air, and directly injected water into the zone.

The invention would be carried out under the conditions of increased, atmosphric or reduced pressure, but is generally operated at the atmospheric or some increased pressure.

Any form of the reaction zone device may be used in the invention, if it can achieve the object of the invention with a close contact of said liquid-including substance and the exhaust gas. For example, in the case of the liquid-including substance has fluidity, the reaction zone device is equipped with at least one pool and the exhaust gas for treating is charged into or on the surface of the liquid-including substance in the pool to allow them to closely contact with each other. Further, the liquid-containing substance is sprayed on the surface of the packings in the capturing zone in a part of the device for capturing the entrainment accompanied by the exhaust gas in the down stream so that the liquid-including substance may have a large area of the contact surface to efficiently capture the carbon-containing particles and/or nitrogen oxides, absorb and remove them. The downstream means the lower reaches of the exhaust gas stream and does not mean the below part in the direction of the gravity. The pool may have known means means for promoting gas-liquid contact, if necessary, such as agitation, vibration, supersonics and packings etc.

Any known packing may be used as means of a large contact surface of the capturing zone in the invention, for example, these packings are such as beads, balls, cylinders, rings, saddles, bells, fiber, mesh, wire-mesh, Raschig rings, foams, monolith honeycomb and so on, and in these packings, mesh, fiber, wire-mesh, foam, monolith honeycomb are most preferable, because of their small pressure drop in spite of the large specific surfaces. They are generally made of metals, ceramics or heat resistant polymers.

The construction material for the reaction zone device is required to have high durability in the operation conditions, and is generally metals, ceramics or heat resistant polymers. The metals are, for example, iron, copper, nickel, chromium, molybdenum, titanium etc and their alloys, such as stainless steel, Monel, Inconel, Hasteroy A, B, C, D, F, and the ceramics are silica, alumina, magnesia, zirconia, silicon carbide, silicon nitride, cordierite spodumene and so on. The heat resistant polymers are, for example, perfluorocarbon polymers such as polyperfluoroalkylene, polyperfluoroalkylenoxide, and silicone polymers etc.

The reaction zone may be made up at least one step in series or parallels, and if necessary, after treating device may be connected after the reaction device. The function of the after treating device is to treat the remains of the mist and/or pollutants from the reaction zone device. For example, the same structure of said reaction zone device may be used as the after treating device with or without water as an after-treating medium and/or a capturing zone with solid carbon like char coal, coke and/or active carbon, if necessary, in the presence of known catalyst promoting the reaction of nitrogen oxides with the carbon, for example, alkali metals like potassium, copper cerium, vanadium, molybdenum, etc and their compounds. As another example, the $NO_x$ storage-reduction three way catalyst system may be used for treating the remaining nitrogen oxides.

The composition of Nitrogen oxides in the exhaust gas varies depending on the condition of the source, but generally, the nitrogen oxides in the exhaust gas mainly consist of nitrogen monoxide NO which is hardly absorbed by the liquid-including substance, and on the contrary, nitrogen dioxide $NO_2$ can be easily absorbed with the liquid-including substance. Thus the nitrogen oxides entering into the reaction zone are preferable to be rich in nitrogen dioxide. The conversion of NO to $NO_2$ is preferably done by oxidation with oxygen remaining in the exhaust gas or air from outside in the presence of suitable oxidation catalyst. Said oxidation catalyst, if possible, can be substituted with the catalyst used in the reaction zone instead of said oxidation catalyst. If want, the catalyst which is used in the reaction zone can be used for the oxidation catalyst. iridium, rhenium, silver, copper, ceria($CeO_2$), manganese oxides, BaO—CuO binary oxide, lanthan-cobalt perovskite ($LaCoO_3$), vanadium pentaoxides, and their mixtures or mixed compounds etc, which carried on known carriers such as, for example, alumina, silica, titania, zirconia, magnesia, silica-alumina, cordierite, spodumene, silicon-carbide, or heat resistant alloys such as stainless steel or iron-chromium alloys etc. The carriers may be used in known shapes such as beads, cylinders, rings, saddles, bells, Rasich rings, monolith-honeycomb etc, but they are generally beads or preferably monolith-honeycomb of "flow-thru" structures for preventing the carbon-containing particles from accumulating and blocking in the packings.

The oxidation of nitrogen monoxide with oxygen over the oxidation catalyst is carried out generally in a temperature range of from 100° C. to 500° C., in particular, from 200° C. to 450° C.

In the case where the exhaust gas to be charged into the oxidation reactor has a low temperature, it can be heated with a usual heating means, for example, an electric heater or other heat sources such as combustion gas, or by adjustment of the operation conditions of the exhaust gas sources, for example, by throttling the internal combustion engine. (Cf. S.A.E. Report No. 830085 (1983).

In the present invention, the carbon-containing particles, carbon monoxide, hydrocarbons and the like as reducing substances in the exhaust gas directly or indirectly react with nitrogen oxides, oxygen and the like whereby these substances in the exhaust gas is converted to carbon dioxide, nitrogen and water. Accordingly, in order to decrease the emission of these reducing substances and nitrogen oxides outside the system to the level lower than the allowable limit, these reducing substances are desirably balanced stoichiometrically with the nitrogen oxides.

In the case where the reducing substances are underbalanced for a long time the substances capable of absorbing the nitrogen oxides, for example, the salts including carbonate radical or the like in the liquid-including substance fall into shortage to insufficiently eliminate the nitrogen oxides and the object of clean up of the exhaust gas can not be attained, because the remaining nitrogen oxides are finally emitted out of the system.

In the meantime, the shortage of the nitrogen oxides causes the lack of the salts including oxygen acid radical of nitrogen in the liquid-including substances, and the carbon-containing particles and other reducing substances are finally emitted out of the system, as they are not sufficiently removed.

Thus, the stoichiometric ratio of the reducing substances including the carbon-containing particles to the nitrogen oxides determines the quality of the exhaust gas emitted out of the system and is required to be kept optimal.

As a method for controlling the ratio of the carbon-containing particles to the nitrogen oxides in the exhaust gas flowing in the device according to the present invention, can be cited, for example, exhaust gas recirculation (E.G.R.), change in fuel injection pressure, adjustment of fuel injection time and the like. In case of the shortage of the reducing substance including the carbon-containing particles and the like, reducing substances, for example, hydrocarbons as methane, liquefied petroleum gases (L.P.G.), fuel oil or the like, alcohols as methanol, ethanol or the like, hydrogen, carbon monoxide may be added from the outside of the system to the exhaust gas to be charged into the reaction zone having the liquid-including substance. In another case, carbon particles produced by catalytic reaction or incomplete combustion of fuels may be charged.

In addition, in order to remove the remaining nitrogen oxides, the after-treating device with solid carbon or the NO storage-reduction three way catalyst system may be applied.

It has been known that the effective life time of known means for treating of the exhaust gas is remarkably influenced by the impurities included in the fuel, for example, sulfur. In the exhaust gas treatment for diesel engine, wherein fuel of high sulfur content is often used, the catalyst supported on solid carriers used in the known means can not yet attain the practical catalyst life.

On the contrary, the liquid-including substance according to the present invention, differing from the catalysts carried on solid carriers that are restricted in their catalyst contents, can still retain the ability for a long term to treat the nitrogen oxides and the carbon-containing particles by fitting a large capacity of the reaction zone device, even after a large volume of the exhaust gas is treated to absorb SO.

In addition, even when the ability to treat the exhaust gas in the liquid-including substance have dropped after its long operation, the ability can be recovered easely and inexpensively by draining a part or all of the old contents, then introducing freshly prepared the liquid-including substance or the compositions which can be form the substance.

When the solid carrier-supported catalyst such as the $NO_x$ absorption reduction type three way catalyst system is set to the downstream of the reaction zone of this invention in order to remove nitrogen oxides, a long catalyst life can be expected, even in the exhaust gas from diesel engine since almost parts of the sulfur oxides and carbon-containing particles are readily removed in the reaction zone according to this invention.

In the invention, the danger of explosion due to the presence of the carbon particles and the salts including oxygen acid radical of nitrogen-containing can be safely avoided by appropriately controlling the temperature and the composition, particularly the moisture and the atomosphere. When an abrupt temperature increase is predicted, it can be prevented by rapidly injecting water or steam into the system.

The constitution of the exhaust gas treating apparatus according to this invention and its actions will be explained by reference to the drawings. This invention, however, is not limited to these. The treatment of exhaust gas from an internal-combustion engine will be described here, but the source of exhaust gas is not limited thereto.

FIG. 1 shows a schematic illustration of an apparatus for carrying out an embodyment of treating the exhaust gas from an internal combustion engine in the invention. In FIG. 1, the reaction zone device 5 having the liquid-including substance is jointed to the exhaust passage 3 from the exhaust manifold 2 for the engine 1 and the exhaust gas passes through them before it is emitted via the muffler 7 out to the atomosphere.

Figure 2:
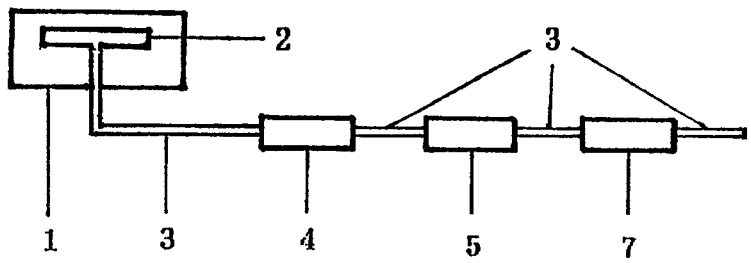
FIG. 2 is a block schematic diagram of another apparatus for embodying the invention.

FIG. 2 shows another schematic illustration of constitution of the apparatus according to this invention. An oxidation reactor 4 is set between the reaction zone device 5 having the liquid-including substance and the exhaust manifold 2 in FIG. 1.

Figure 3:
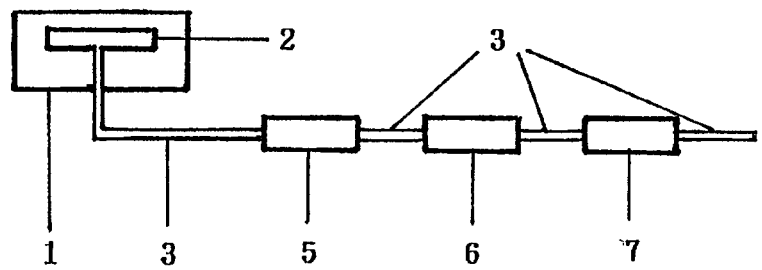
FIG. 3 is a block schematic diagram of another apparatus for embodying the invention.

FIG. 3 shows another schematic illustration of constitution of the apparatus according to this invention. A after-treatment device 6 is installed between the reaction zone device 5 and the muffler 7 in FIG. 1.

Figure 4:
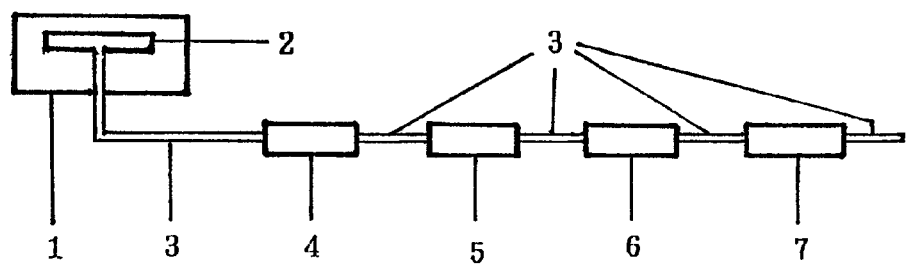
FIG. 4 is a block schematic diagram of another apparatus for embodying the invention

FIG. 4 shows another schematic illustration of constitution of the apparatus according to this invention, the after-treatment device 6 is installed between the reaction zone device 5 and the muffler 7 in FIG. 2.

Figure 5:
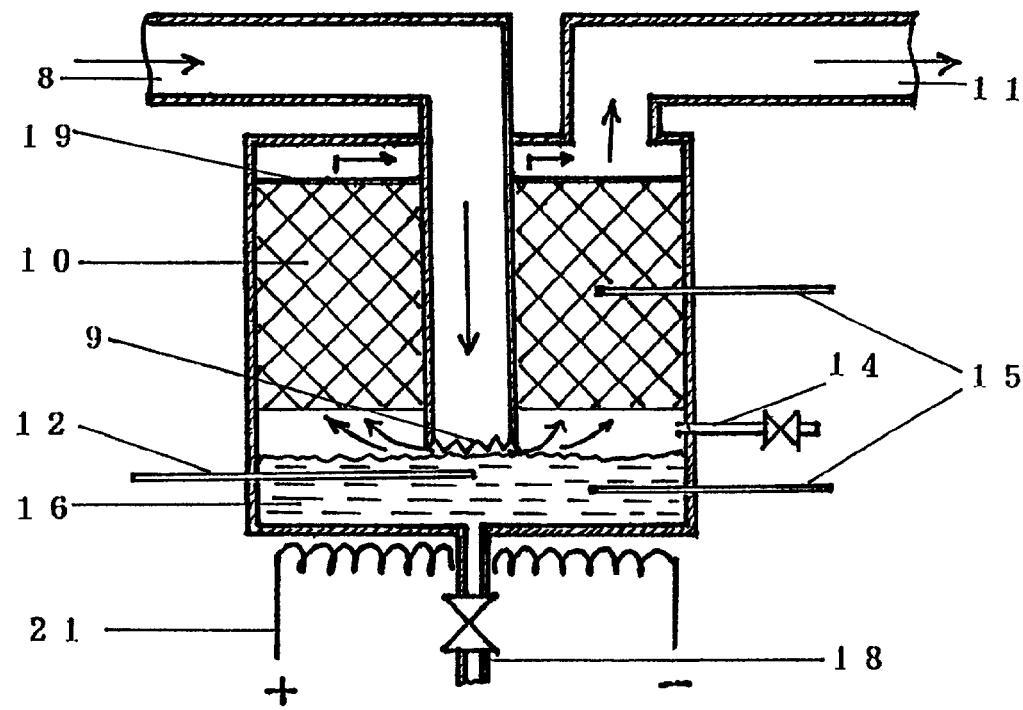
FIG. 5 is a cross sectional plan view of a reaction zone device for carrying out the invention.

FIG. 5 shows a schematic plan view of the reaction zone device having the liquid-including substance. The device has at least one pool 16 at its lower part and an exhaust gas blow nozzle 9 for injecting the exhaust gas is opened from its upper part near the surface of the liquid-including substance in the pool, thus the exhaust gas can directly contact with the liquid-including substance in the pool. A liquid exit nozzle 18 is set in the lower part of the pool and a capturing zone 10 with packings or monolith honeycomb or the like is provided above the pool to capture the entrainment of the liquid-including substance entrained by the exhaust gas, and the captured entrainment extends on the surface of the packings or the monolith honeycomb in the capturing zone to form a surface film layer of the liquid-including substance thereon, whereby the close contact between the liquid-including substance and the exhaust gas is attained, then the treated exhaust gas is led to the exhaust gas outlet 11 through a filter 19 composed of at least one of metals, glasses, ceramics, heat resistant polymers and the like. The reaction zone device is further equipped with at least one of temperature detector 15 for the capturing zone, with at least one of temperature detector 15 and at least one of viscosity detector 12 in the liquid-including substance in the pool, with an electric heater 21 for retaining the prescribed temperature at its lower part, and with a liquid flow inlet 14 that also can be used for emergent injection of water on the outer periphery.

Figure 6:
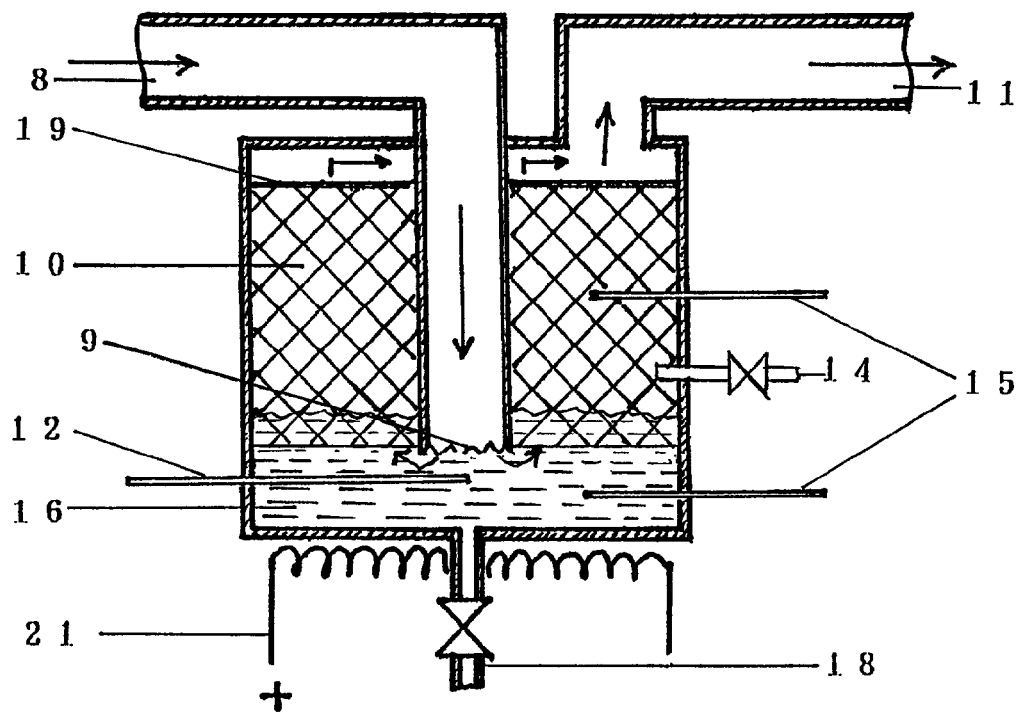
FIG. 6 is a cross sectional plan view of another reaction zone device for carrying out the invention.

FIG. 6 shows one example that the capturing zone in the reaction zone device in FIG. 5 is partially immersed in the liquid-including substance in the pool at its lower part.

Figure 7:
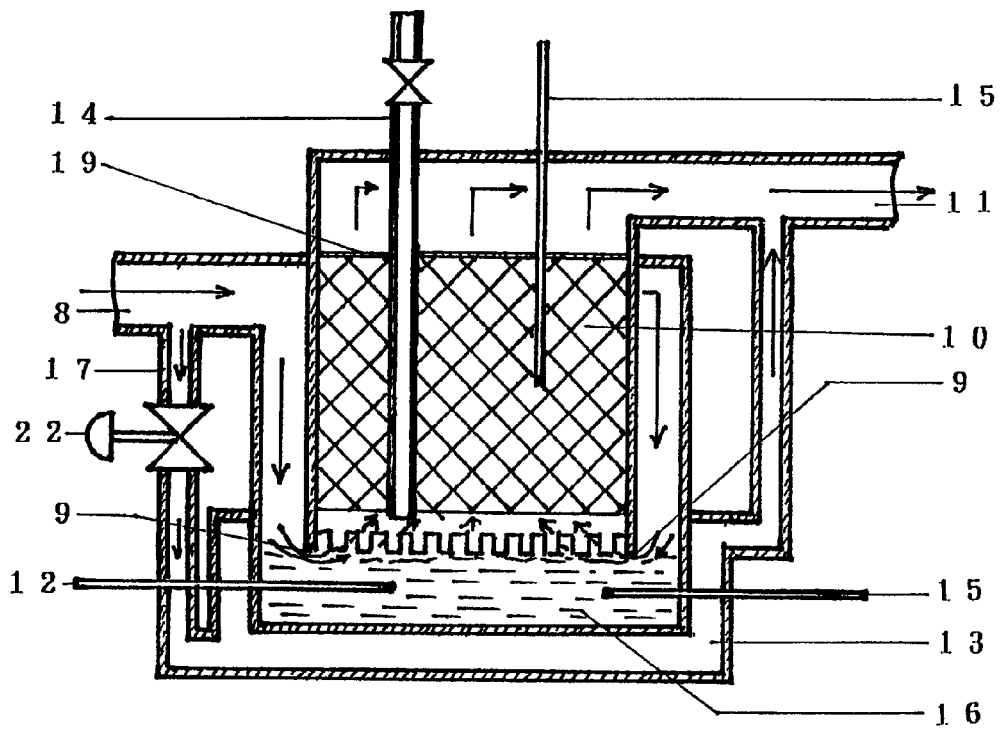
FIG. 7 is a cross sectional plan view of another reaction zone device for carrying out the invention.

FIG. 7 shows a schematic cross sectional plan view of another reaction zone device according to this invention. The exhaust gas from the exhaust gas inlet 8 flows down along the peripheral cylindrical walls comes into contact with the surface of the liquid-including substance in the pool 16, then flows up through the central cylindrical part via the capturing zone 10 and the filter 19 set at the upper part of the device 5, and reaches the exhaust gas outlet 19. The device is jacketed at its outer periphery and the lower part, and they are connected via the exhaust gas by-pass valve 22 to the exhaust gas by-pass 17.

Figure 8:
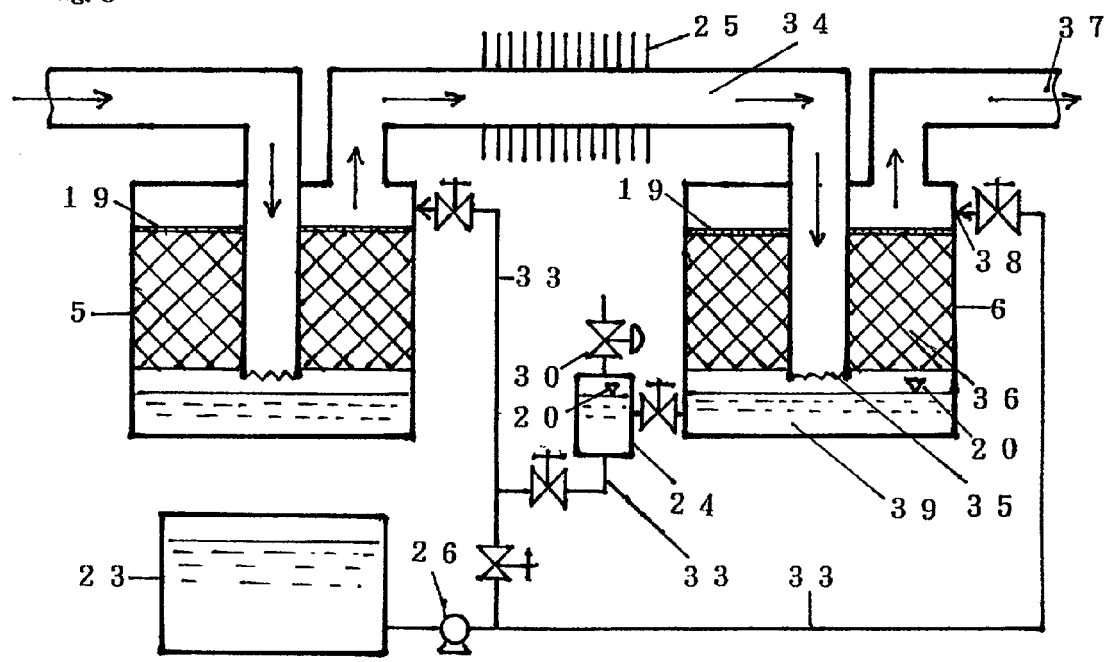
FIG. 8 is a plan view of combination a reaction zone device and an after-treating device for carrying out the invention.

FIG. 8 shows a schematic plan view of a combination of the reaction zone device and the after-treating device. The exhaust gas passed through the reaction zone device 5 and, if necessary, cooled with an exhaust gas cooler 25 flow into the after-treating device 6. The after-treating device 6 can be the same form of the reaction zone device 5. When water is used as an after-treating medium, water is introduced continuously or intermittenly from a storage tank 23 with a conduit 33, when water is used as a capturing medium of the mist. The introducing position of the capturing medium like water can be allowed any of the upper part 38 or the lower part of the capturing zone 36, the pool 39, and the part between the exhaust gas inlet 34 and the exhaust gas blow nozzle 35. The mist-including water which captured the mist in the pool 39 can be sent continuously or intermittently to the reaction zone device 5 based on the information on the liquid surface sensor 20, if necessary, the content of the pool 39 can send to an intermidiate tank 24, and then to the reaction zone device with a pump(not illustrated) or pressurized air via a pressurized air valve 30 and the introducing position is the same case of the device 6. The after-treated exhaust gas is emitted via the exhaust gas outlet 37. When solid carbon is used as an after-treating medium, the solid carbon can be packed in the capturing zone 10 of the after-treating device 6.

Figure 9:
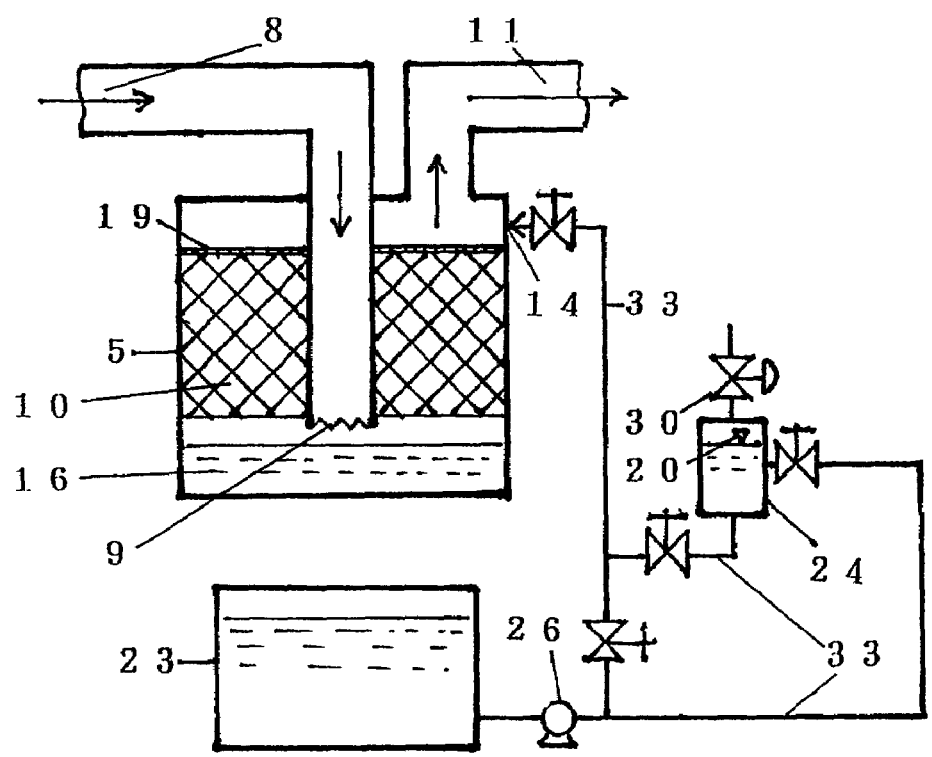
FIG. 9 is a plan view of combination of a reaction zone device and a water feeding system for carrying out the invention.

FIG. 9 shows a plan view of combination of a react ion zone device and a water feeding system therefore. Water is introduced from a storage tank 23 with a conduit 33 to the reaction zone device on demand. If necesary water in the storage tank 23 can be sent to an intermidiate tank 24 and then to the reaction zone device with a pulp (not illustrated) or pressurized air via a presurized air valve 30. The introducing position of water can be allowed any position of the upper part 14 or the lower part of the capturing zone 10, the pool 16 and the part between the exhaust gas inlet 8 and the exhaust gas blow nozzle 9.

The water using systems contribute to provide for emergencies of the exhaust gas treating system and prevent for solidifing the liquid-including substance in the end of operations, thereby securing the ability of treating the exhaust gas with the liquid-including substance at the resuming of operation by water introduction.

Figure 10:
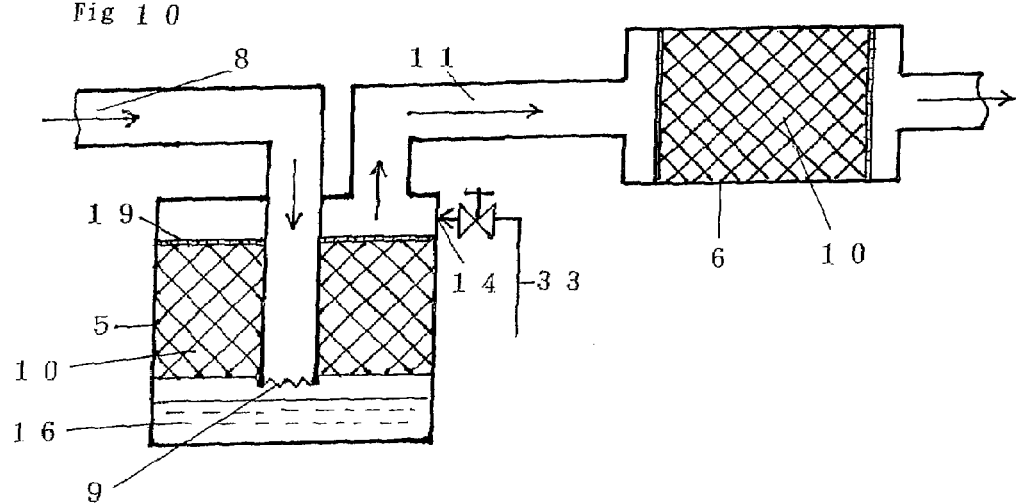
FIG. 10 is a plan view of another combination of a reaction zone device and an after-treating device for carrying out the invention.

FIG. 10 shows an another plan view of combination of a reaction zone device and an after-treating device with solid carbon, where the after-treating device 6 packing solid carbon as an after-treating medium is set to the downstream of the reaction zone device 5, if necesary, with a water feeding system like FIG. 9 and water is introduced by a conduit 33 from the system.

Subsequently, some small scale experimental results of the reaction between the liquid-including substance and carbon-containing particles in a test tube are shown as a preliminary test to select the liquid-including substance.

A small amount (about 1 gram) of canditate samples of the liquid-including substance was taken in a test tube and heated to molten state at a prescribed temperature, if necesary, with distilled off water. Then an small spatulaful of carbon-containing particles (about 10 mg) was put into the test tube. Generated bubbles were composed of gas having $N_2$ and $CO_2$ and generated white solid dispersed particles were composed of the salts including carbonic acid radical.

These results are as follows.

| Exp. No. | Sample Composition | Results |
|---|---|---|
| 1 | $Mg(NO_3)_2.6H_2O$ | The sample was heated at 240° C. to a colorless transparent fluent molten liquid. Adding carbon-containing particles thereinto and heating up 260° C.~300° C., the liquid generated vigorous bubbles, thereby losing its black color turn to a molten liquid having white solid dispersed particles after about 30 minutes |
| 2 | $Ca(NO_3)_2.4H_2O$ | Adding carbon-containing particles into a colorless, transparent fluent molten liquid of the sample at 260° C.~270° C. the liquid produced vigorous bubbles, thereby losing its black color turn to a molten liquid including white solid dispersed particles after about 60 minute. |
| 3 | $KNO_3$ + $Ca(NO_3)_2.4H_2O$ (Mol Ratio 1:1) | Adding carbon-containing particles into a colorless, transparent fluent molten liquid of the sample which water was distilled off, at 240° C.~280° C., the liquid generated bubbles and further adding a small amount of $Cu(NO_3)_2.3H_2O$, the bubbles generated more vigorously. |
| 4 | $KNO_3$ + $Mg(NO_3)_2.6H_2O$ (Mol Ratio 1:1) | Heating from the normal temperature to 240° C.~280° C., the sample distilled off water to a colorless, transparent fluent molten liquid. Adding carbon-containing particles to the liquid, bubbles generated to emit gas having $Co_2$ and the condition of bubbling was more vigorous than its of the experiment No. 3. |
| 5 | $H_3po_3$ + $NaNO_3$ (Wt. Ratio 10:1) | $NaNO_3$ settled as solid in liquid phosphoric acid at the normal temperature, but completly solved to a colorless and transparent solution by heating and then held at 260° C. Adding carbon-containing particles to the solution, bubbles generated vigorously. |
| 6 | $KH_2PO_3$ + $KNO_4$ (Wt. Ratio 2:1) | The sample was heated at 280° C.~340° C. to form a molten liquid, Adding carbon-containing particles to the liquid, bubbles generated vigorously. |
| 7 | $KHSO_2$ + $KNO_4$ (Wt.Ratio 2:1) | The sample melted to a completly transparent molten liquid at 240° C. Adding carbon-containing particles to the liquid, bubbles generated. |
| 8 | $KNO_3$ + $Zn(NO_3)_2.6H_2O$ (Mol. Ratio 2:1) | The sample melted to a transparent molten liquid at 210° C. Adding carbon-containing particles to the liquid, bubbles generated vigorously. |
| 9 | $KNO_3$ + $Al(NO_3)_3.9H_2O$ (Mol. Ratio 1:1) | The sample melted to a molten liquid at 210° C. Adding carbon-containing particles to the liquid, bubbles generated vigorously. |
| 10 | $Ca(NO_3)_2.4H_2O$ = $La(NO_3)_3.6H_2O$ (Mol. Ratio 1:1) | Adding carbon-containing particles to a molten liquid of the sample at 240° C.~260° C., of which water was distilled, bubbles generated vigorously. |
| 11 | $La(NO_3)_3.6H_2O$ | Adding carbon-containing particles to a colorless, transparent molten liquid of the sample at 240° C., from which water was distilled, bubbles generated vigorously and white solid dispersed particles were produced in the liquid after about 30 minutes. |

The following examples of the tests by a vehicle equipped with the apparatus of the invention are described with FIG. 2 and FIG. 5, but the invention is not limited to them.

EXAMPLE 1

Referring to FIG. 2, the catalyst of 0.5 wt % platinum on the monolithic ceramic honeycomb support was set in the oxidation reactor 4. The pool 16 of the reaction zone device in FIG. 5 was fed with magnesium nitrate hexahydrate 385 grams, magnesium carbonate basic 183 grams, and water 500 grams. The capturing zone 10 of the device was packed with wire mesh made of metallic copper about 630 grams. The exhaust gas from the diesel engine 1 (1800 c.c. capacity) passed via the exhaust manifold 2, the exhaust pipe and the oxidation reactor 4 and went into the reaction zone device 5. The oxidation reactor 4 was maintained at a temperature of higher than 200° C. The exhaust gas further passed through the exhaust gas inlet 8 and came into contact with the liquid-including substance having the above described composition. The exhaust gas rose up with the entrainment of the mist of the liquid-including substance and passed through the capturing zone 10 where the mist of the liquid-including substance in the exhaust gas was captured and the packings were wetted with the liquid-including substance. The carbon-containing particles and the nitrogen oxides in the exhaust gas came into contact with the liquid-including substance on the wetted surfaces of the capturing zone and were removed through the absorption and the reactions. Then, the treated exhaust gas was released via muffler 7, to the outside.

The inside temperature of the reaction zone gradually rose after the engine was started and the free moisture was almost distilled off. The temperature was further elevated and the operation of the reaction zone was continued at about 185° C.~190° C. The Nitrogen oxides removal rate of the released exhaust gas was about 76% on average, and the black smoke of the carbon-containing particles was not observed.

The operation of the reaction zone at the inside temperature of about 80° C.~98° C. was found to be insufficient for the removal of nitrogen oxides and the black smoke. The operation at a temperature over about 400° C. resulted in the increase of nitrogen oxides on the contrary and the object of the nitrogen oxides removal could not be attained.

EXAMPLE 2

Using the same device as example 1, magnesium nitrate hexahydrate 385 grams, magnesium carbonate, basic 183 g and Water 300 grams were fed in the pool of the reaction zone device and the packings of the capturing zone were wetted a mixture of potassium nitrate 101 grams, potassium carbonate 46 grams and Water 200 grams. The experiment was carried out the same manner as example 1 except for a temperature in the reaction zone at about 200° C.~220° C. Average removal rate of nitrogen oxides was about 72% on average and the black smoke of the carbon-containing particles was not observed.

EXAMPLE 3

Using the same device as example 1 except for using of wire mesh of 316 stainless steel for the packings of the capturing zone of the reaction zone device, the pool and the capturing zone of the reaction zone device were each fed with potassium nitrate 101 grams, magnesium nitrate hexahydrate 256 grams, potassium carbonate 138 grams, cupric nitrate trihydrate 5 grams, vanadium pentaoxide 5 grams, and water 500 grams. The experiment was carried out the same manner as example 2, except for the temperature in the reaction zone at about 240° C.~260° C. A removal rate of the nitrogen oxides was about 73% on average and the black smoke of the carbon-cotaining particles was not observed.

EXAMPLE 4

In the same device as example 3, the capturing zone was filled with solid catalyst which carried 0.5 wt % platinum on alumina beads of 225 grams in the packings of 316 stainless wire mesh. The pool of the reaction zone device was fed with magnesium nitrate hexahydrate 256 grams, magnesium carbonate, basic 274 grams sodium carbonate 159 grams and Water 500 grams. The experiment carried out in the same manner as example 2, except for the temperature in the reaction zone at about 230° C.~250° C., the removal rate of the nitrogen oxides was about 71% on average and the black smoke of the carbon-containing particles was not observed.

EXAMPLE 5

In the same device as example 1, a monolithic ceramic honey-comb was installed vertically in the capturing zone of the reaction zone device. The pool of the reaction zone device was fed with potassium nitrate 101 grams, calcium nitrate tetrahydrate 236 grams, cupric nitrate trihydrate 10 grams, vanadium pentaoxide 10 grams and water 400 grams. The experiment carried out the same manner as example 2, except for the temperature in the reaction zone at about 250° C.~270° C. A removal rate of the nitrogen oxides was about 70% on average and the black smoke of the carbon-containing particles was not observed.

The exhaust gas treating ability of the liquid-including substance in the invention may gradually decline by accumulating salts of oxygen acids of sulfur which salts may form from absorbing sulfur oxides in the exhaust gas with the liquid-including substance for a long term operation. The increase of the salts of oxygen acids of sulfur can be detected by chemical analysis or physical methods like viscometry as increase of solid matter in the liquid-including substance, these viscometers are used known ones which can be applied for slurry solutions, for example, a rotary viscometer or a vibrating one. At the same temperature condition, if the viscosity of the liquid contents in the reaction zone device risen 10~50 times from it in the early stage of the operation with no accumulation of the sulfates, the volume concentration of the insoluble sulfate in the liquid content may reach 40~50%, thus the fluidity of the liquid content is bad. The liquid content is exchanged by introducing a fresh composed substance after diluting and washing with introduced water and taking out the water. At this time, metal ions as constituents of the liquid-including substance like calcium, strontium and barium tend to make scale of hardly soluble sulfates on the inner surface of the reaction zone device, the surface may be coated with such a heat resistant and non adhesive coating material as polyperfluoroalkylene, polyperfluoroalkylenoxides and/or their copolymers to reduce the scale adhesion When solid catalysts carried compounds having alkali metals or alkali earth metals on carriers, for example, the carbonate salts, instead of the reaction zone with the liquid-including substance of this invention are installed in the passage of the exhaust gas, the nitrogen oxides in the exhaust gas is absorbed and saturated in the solid catalyst in a short time, and emited to the atomosphere with its removal insufficiently, and the carbon-containing particles are hardly captured and removed insufficiently.

INDUSTRIAL APPLICABILITY

By installing the reaction zone having the liquid-including substance which can react with the carbon-containing particles and/or the nitrogen oxides in the exhaust gas in the passage of the exhaust gas in the invention, the exhaust gas having these pollutants is purified with simultaneous removal of the carbon-containing particles and the nitrogen oxides in spite of the presence of residual oxygen and water vapor. Because the exhaust gas is treated with a large amount of the liquid-including substance compared to the pollutants therein. Consequently, the system can resist any change in the amount of the pollutants in the exhaust gas and thus, complicated controll of the system is not necesary to perform a smooth operation.

Using vehicles which do not conform to the goverment regulations on the exhaust gas may expect to clear the regulations by equipping this apparatus of the invention.

What is claimed is:

1. An apparatus for treating an exhaust gas in a passsge of the exhaust gas by installing a liquid-including substance which has at least partially liquid surface and can adhere to capture at least one of carbon-containing particle in the exhaust gas having at least one liquid selected from the liquid containing a salt including oxygen acid radical of nitrogen in an amount exceeding a salt including carbonic acid radical dissolved in the liquid-including substance, and the liquid containing a salt including oxygen acid radical of nitrogen having solid that can form the salt including oxygen acid radical of nitrogen by absorbing nitrogen oxides.

2. An apparatus according to claim 1, wherein the liquid-including substance is the liquid containing the salt including oxygen acid radical of nitrogen in the amount exceeding the salt including carbonic acid radical dissolved in the liquid-including substance.

3. An apparatus according to claim 1, wherein the liquid-including substance is the liquid containing the salt including oxygen acid radical of nitrogen having solid that can form the salt including oxygen acid radical of nitrogen by absorbing nitrogen oxides.

4. An apparatus according to claim 1, wherein the salt including oxygen acid radical of nitrogen contains a salt including nitrate radical.

5. An apparatus according to claim 1, wherein the solid is the solid containing the salt including carbonic acid radical.

6. An apparatus according to claim 1, wherein the liquid is molten liquid.

7. An apparatus according to claim 1, wherein the liquid contains water.

8. An apparatus according to claim 1, wherein the salt including oxygen acid radical of nitrogen is hydrated salt.

9. An apparatus according to claim 1, wherein at least one of the salt including oxygen acid radical of nitrogen and the solid that can form the salt including oxygen acid radical of nitrogen includes at least one of metallic ions with the square root of the ionization potential smaller than 2.2.

10. An apparatus according to claim 1, wherein at least one of the salt including oxygen acid radical of nitrogen and the solid that can form the salt including oxygen acid radical of nitrogen includes at least one of metallic ions selected from group 1, group 2 and group 3 including rare earth elements in the periodic table.

11. An apparatus according to claim 1, wherein at least one of the salt including oxygen acid radical of nitrogen and the solid that can form the salt including oxygen acid radical of nitrogen includes at least one of metallic ions selected from sodium, potassium, magnesium and calcium.

12. An apparatus according to claim 1, wherein at least one of the salt including oxygen acid radical of nitrogen and the solid that can form the salt including oxygen acid radical of nitrogen includes at least one of metallic ions selected from magnesium.

13. An apparatus according to claim 1, wherein the exhaust gas contact with the liquid-including substance in the presence of at least one of catalyst containing at least one selected from platinum, palladium, rhodium, copper, nickel, vanadium, cobalt, molybdenum, cerium, silver, iron, manganese and lead.

14. An apparatus according to claim 1, wherein the apparatus is operated at a temperature higher than 100° C. and lower than 300° C.

15. A vehicle equipped with the apparatus as claimed in claim 1.

16. An apparatus for treating an exhaust gas in a passage of the exhaust gas by installing a liquid-including substance which has at least partially liquid surface and can adhere to capture at least one of carbon-containing particle in the exhaust gas, wherein a salt including oxygen acid of nitrogen in at least one state of at least partially molten state and at least partially dissolved state in the liquid and a salt including carbonic acid radical that is reactive with nitrogen oxides in the exhaust gas are present, whereby they may come into close contact each other.

17. An apparatus for treating an exhaust gas in a passage of the exhaust gas by installing a liquid-including substance which has at least partially liquid surface and can adhere to capture at least one of carbon-containing particle in the exhaust gas having at least one liquid selected from the liquid containing a salt including oxygen acid radical of nitrogen in an amount exceeding a salt including carbonic acid radical dissolved in the liquid-including substance, and the liquid containing a salt including oxygen acid radical of nitrogen having solid that can form the salt including oxygen acid radical of nitrogen by absorbing nitrogen oxides, wherein the apparatus comprising:

a reaction zone device equipped with at least one pool where at least one exhaust gas blow nozzle is opened at least in the liquid-including sustance and in the vicinity of the surface of the liquid-including substance in the pool, and with at least one capturing zone that captures entrainment of the liquid-including substance constitutes a contacting surface area between the exhaust gas and the liquid-including substance.

18. An apparatus according to claim 17, wherein the apparatus further comprising:

means for feeding water to the reaction zone device.

19. An apparatus according to claim 17, wherein the apparatus further comprising:

an after-treating device equipped with at least one water pool where at least one blow nozzle for the exhaust gas treated in the reaction zone is opened at least in the water and in the vicinity of surface of the water in the pool, and at least one capturting zone that captures entrainment of the water, and means for feeding water to the after-treating device and sending the water contacted with the exhaust gas in the after-treating device to the reaction zone device.

20. An apparatus according to claim 17, wherein the apparatus further comprising:

an after-treating device equipped with solid carbon.

* * * * *